United States Patent [19]

Simpson

[11] Patent Number: 5,273,092
[45] Date of Patent: Dec. 28, 1993

[54] DEVICE FOR STORING AND INSTALLING VEHICULAR TIRE CHAINS

[76] Inventor: Robert W. Simpson, 16202 Tunisia Cir., Placentia, Calif. 92670

[21] Appl. No.: 856,182

[22] Filed: Mar. 23, 1992

[51] Int. Cl.⁵ .......................................... B25B 27/22
[52] U.S. Cl. ................................. 152/213 R; 81/15.8
[58] Field of Search ............. 254/88; 152/152, 213 R, 152/213 A; 81/15.8

[56] References Cited

U.S. PATENT DOCUMENTS 4,103,870  8/1978  Murakami ................ 152/213 R X
4,487,314  12/1984  Stewart ................... 152/213 R X Primary Examiner—Michael W. Ball
Assistant Examiner—Francis J. Lorin
Attorney, Agent, or Firm—John E. Vanderburgh

[57] ABSTRACT

A device for installing tire chains consists of a container for storing the tire chains when not in use and a removable lid which serves as a closure for the container and as an aid for installation. The lid is adapted for supporting the wheel of the vehicle during the chain installation process. The device further includes latch means for removably securing the lid over the open top of the container for the storage of tire chains One surface of the lid is provided with a raised platform on which the vehicle wheel rests during the chain installation process. The raised platform extends longitudinally on the upper face of the lid and is provided with a pair of channels which are open at the top and at their ends and which extend normally to the longitudinal axis of the lid for receiving lateral members of the tire chain being installed. The bottoms of the channels are disposed in a plane vertically below the surface of the platform so that the lateral member received therein lies below the wheel and the chains can be readily moved laterally while the wheel is resting on the platform. Accordingly, there is no weight on the chain and it can be freely moved, especially in a lateral direction which makes the installation substantially easier. In addition, the platform raises the vehicle somewhat to make access to the inner face of the wheel more convenient for attaching the inside longitudinal member of the tire chain. At least one end of the lid is extended to define stabilizing surface for the wheel before it reaches the platform.

4 Claims, 2 Drawing Sheets

DEVICE FOR STORING AND INSTALLING VEHICULAR TIRE CHAINS

FIELD OF THE INVENTION

This invention relates to a device for installing and storing vehicular tire chains.

BACKGROUND OF THE INVENTION

Anyone having driven in inclement winter weather using tire chains is well aware of the inconvenience of installing tire chains on the driving wheels of a vehicle. Several methods are commonly practiced such as for example jacking the automobile up in order to provide access and freedom of movement around the tire while installing the tire chains. The use of the automobile jack to install chains can be a dangerous operation on snowy or icy surfaces and presents a significant risk of injury to the individual installing the chains. A more common method for installing tire chains is to simply lay a chain out on the snowy surface or pavement and to move the vehicle so that the wheel on which the chain is to be installed is positioned on the chain. The inner and outer longitudinal members of the chain are then linked together to complete the installation process. This method, although the most commonly practiced, requires reaching under the vehicle to hook the inner longitudinal member. This is a messy and inconvenient procedure since access between the inner face of the wheel is limited by the vehicle fender and usually there is significant amount of mud and dirty snow and the like on the undersurface of the vehicle and fender resulting in soiling of the hands and clothing while installing the chain. In addition to the foregoing, the storage of the tire chains when not in use can be troublesome and usually results in storing chains in a burlap sack or the like or even loose in the trunk of the automobile resulting in inefficient use of trunk space.

SUMMARY OF THE INVENTION

Accordingly, it is an object of the present invention to provide a device which makes the installation of tire chains on vehicular wheels a more convenient operation.

Another object of the present invention is to provide a device for storing tire chains when not in use.

These and other objects of the invention are achieved by the device described more fully hereinafter which comprises a container for storing tire chains when not in use and a removable lid which serves both as a closure for the container and which is adapted for carrying the wheel of the vehicle during the chain installation process. The device further includes latch means for removably securing the lid over the open top of the container for the storage of tire chains In accordance with the present invention one surface of the lid is provided with a raised platform on which the vehicle wheel rests during the chain installation process. The raised platform extends longitudinally on the upper face of the lid and is provided with at least one perpendicularly extending channel which is open at the top and at the ends for receiving lateral members of the tire chain being installed. The bottom of the channel is disposed in a plane vertically below the surface of the platform so that the lateral member received therein lies below the wheel and the chains can be readily moved laterally while the wheel is resting on the platform. Accordingly, there is no weight on the chain and it can be freely moved, especially in a lateral direction which makes the installation substantially easier. In addition, the platform raises the vehicle somewhat to make access to the inner face of the wheel more convenient for attaching the inside longitudinal member of the tire chain. One end of the lid is longitudinally extended to provide a surface for receiving the vehicle wheel prior to it being driven onto the raised platform. In this manner the lid is stabilized. The extended end of the lid also serves to define a handle for the container when the lid is assembled thereon.

These and other objects and advantages of the present invention will become apparent from the following detailed description taken in conjunction with the drawings.

DETAILED DESCRIPTION OF THE INVENTION

Figure 1:
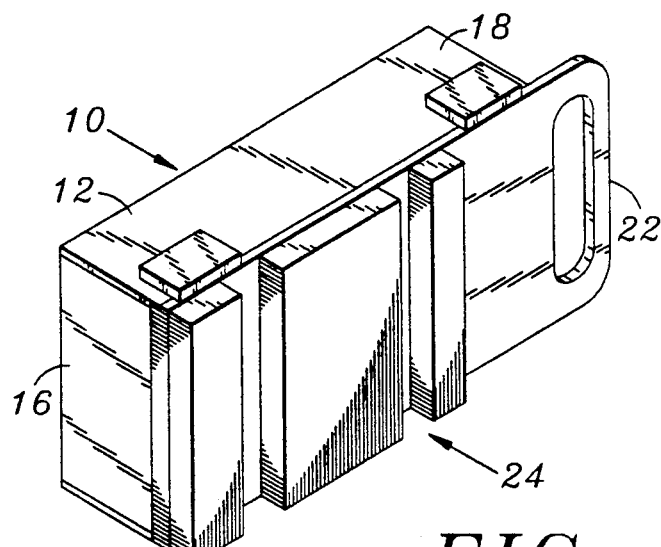
FIG. 1 is a prospective view of the container and lid in fully assembled condition.
Figure 2:
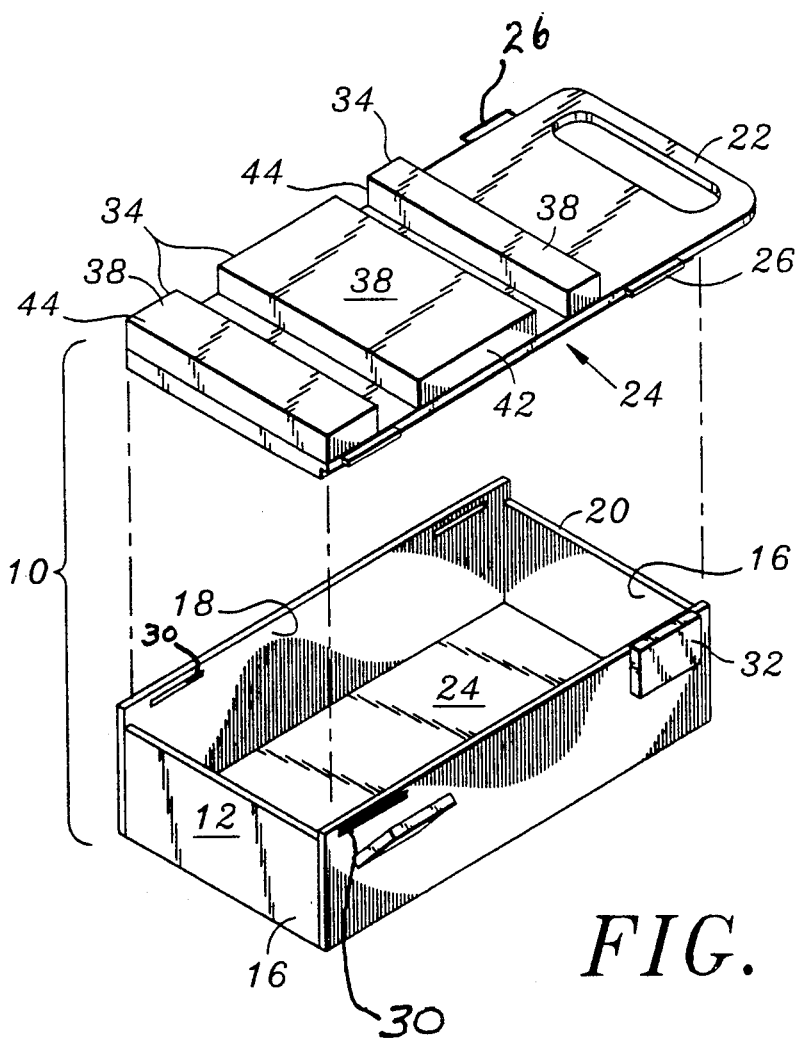
FIG. 2 is an exploded prospective view of the container and lid.

Referring to FIGS. 1 and 2, there is illustrated a device 10 which, in accordance with the invention, includes a container 12 having a bottom wall 14, end walls 16 and longitudinal walls 18 which define an interior for receiving and storing tire chains and an open top 20 for access to the interior. The open top 20 of the container 12 is closed by a lid 24 which is removably attached to the container 12 by suitable latch means, such as ears 26 provided on the longitudinal edges 28 of the lid 24 which are adapted to be received in and extend through corresponding slots 30 located on the longitudinal walls 18 of the container 12 adjacent the open top. A pair of locking latches 32 are pivotally attached to one longitudinal wall 18 and each latch 32 is aligned with a corresponding one of the slots 30. Each latch 32 is provided with means, such as a locking slit (not shown) for receiving and grasping an extending end of an ear 26 to prevent its removal from the slot and thus lock the lid 24 on the container 12. Preferably the locking latches 32 are attached on the longitudinal wall 18 which carries the handle 22 so that the opposite longitudinal wall 18 can provide a stable base for the case when it is set down on a surface.

The lid 24 is adapted for the tire chain installation procedure by the provision of a platform 34 on a face of the lid 24 which defines a raised surface 38 on which a vehicular wheel and tire combination, hereafter the wheel 40, rests during the tire chain installation process. In the preferred embodiment the platform 34 is oriented longitudinally on the the face of the lid and consists of a central block 42 and a pair of side blocks 44, each of which are spaced from the central block 42 to define therebetween a channel 46 which extends laterally across the lid 24. Each channel 46 is open at its top and at its ends for receiving a lateral chain member. One end of the lid 24 is extended longitudinally beyond the the platform 34 to define a surface 48 between the platform 34 and the edge of the lid 24 which lies in a lower vertical plane than the raised surface 38 of the platform 34. This surface area 48 first carries the weight of the vehicle when it is driven onto the device and stabilizes the device to prevent it from being pushed by the wheel 40 as it contacts the end of the platform 34. This can readily occur, particularly on a snow covered surface, as the wheel 40 is being driven up on the platform, unless the device is stabilized. The extended end of the lid 24 is also provided with an laterally elongated opening 49 so that a handle 22 is formed at the lateral edge of the extended end for carrying the container and lid assembly.

Figure 3:
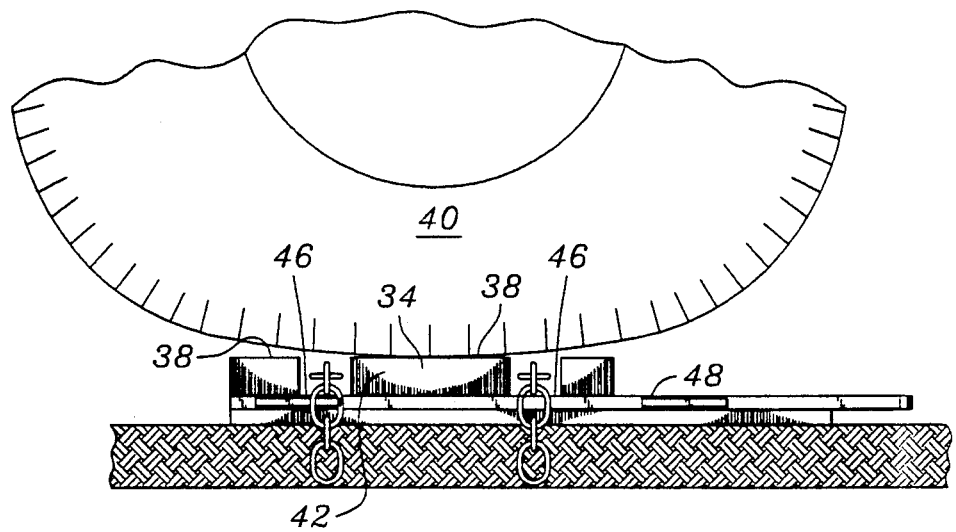
FIG. 3 is a side elevation of the lid.
Figure 4:
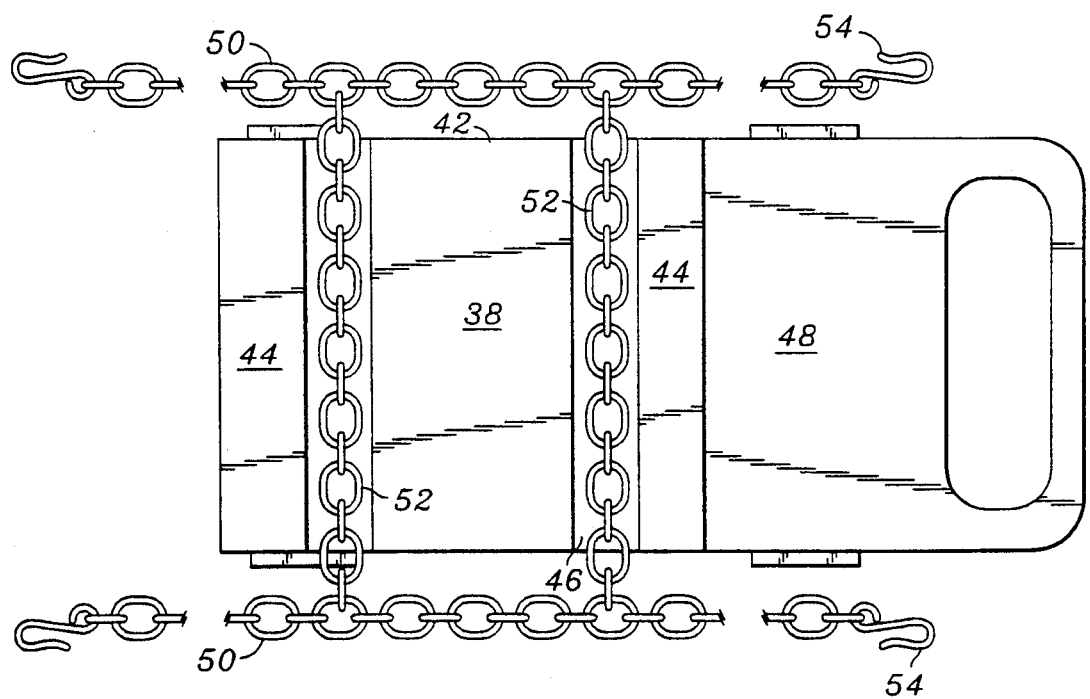
FIG. 4 is a top plan view of the lid.

Referring to FIGS. 3 and 4, the operation of the device is illustrated in conjunction with a conventional tire chain which comprises a pair of longitudinal chain members 50 interconnected by a plurality of lateral chain members 52 extending between the longitudinal members 50 and which are adapted to fit over the tread surface of the tire tire to provide the gripping action. Conventionally a suitable locking hook 54 is provided on at least one end of each of the longitudinal members 50 for connecting the ends thereof to retain the chain on the tire. The lid 24 of the device is placed on the ground behind the wheel 40 on which the chains are to be installed with the face 36 containing the platform 34 positioned upwardly. The extended end of the lid 24 is disposed towards the wheel so as to receive it and stabilize the lid before the wheel reaches the platform 34. The chain to be installed is spread out on the ground with a longitudinal member 50 on either side of the lid 24 and a lateral member 52 in each channel 46 in the platform 34. The vehicle is then driven up onto the raised surface 38 of the platform 34 and maintained in this position during the installation process. With the wheel 40 resting on the upper surface 36 of the platform, the lateral members 52 in the channels 46 are free to move so that the inner longitudinal member 50 of the chain can be adjusted to provide sufficient slack for easy connection of the ends of the inner longitudinal member 50 by means of the locking hook 54. After the inner longitudinal member 50 is connected the chain can then be pulled laterally up tight against the inner face of the tire which provides slack for the outer longitudinal member 50 for connection of the ends thereof. If desired a chain tension device of conventional design (not shown) can be applied to maintain tension on the outer longitudinal member to maintain chain tension during operation of the vehicle. When the ends of the longitudinal members are connected, the vehicle is driven off of the device and the lateral members of the chain, which is now attached to the wheel, are freely removed from their respective channels.

By maintaining the weight of the vehicle off of the lateral members of the chain during the installation, the chains can be moved laterally on the tire to provide sufficient slack to the longitudinal members to render that the connection and disconnection of these members much more convenient. In addition, with the wheel 40 raised off of the ground, access to the inner side of the tire is enhanced thus making the connection of the inner longitudinal member more convenient and reducing the risk of soiling clothing of an individual installing the chain on the tire. In addition, the device 10 provides a stable platform which substantially reduces the risk of injury when an automobile jack is used, particularly on slippery surfaces under adverse weather conditions.

As mentioned, the container 12 interior is sufficiently dimensioned to receive at least a pair of tire chains for convenient storage of the chains when they are not in use. The entire combination is conveniently carried in the truck of the automobile and takes up a minimum of space.

As will be understood by those skilled in the art, various arrangements other than those described in detail in the specification will occur to those persons skilled in the art, which arrangements lie within the spirit and scope of the invention. It is therefore to be understood that the invention is to be limited only by the claims appended hereto.

Having described the invention, I claim:

1. A device for installing and storing vehicular tire chains comprising a pair of longitudinal chain members connected by a plurality of lateral chain members, said device comprising:
   a. a container having longitudinal walls, end walls and a bottom wall defining an interior and having an open top for receiving said tire chains;
   b. a removable lid having longitudinal and lateral edges for closing said open top of said container, said lid having a surface adapted to support a vehicle wheel, said surface including a platform which defines a raised surface area for carrying said vehicle wheel during installation of said tire chain thereon, a spaced pair of channels extending across the width of said lid perpendicularly to the longitudinal axis thereof, each of said channels being open at its top and at the ends thereof and having a closed bottom surface disposed vertically below the surface area of said platform for receiving a lateral member of said tire chain, at least one lateral end of said lid being longitudinally extended and defining a surface for receiving said vehicle wheel to stabilize said lid and prevent surface movement thereof while said wheel is driven onto said platform surface area; and
   c. latch means for removably securing said lid over said open top of said container.

2. The device of claim 1 wherein a laterally elongated opening extends through said extended end of said lid adjacent said lateral edge thereof thereby to define a handle in cooperation with said lateral edge.

3. The device of claim 1 wherein both lateral ends of said lid are extended and a laterally elongated opening is disposed in said lid adjacent each edge thereof to define a handle at each end of said lid.

4. A device for installing and storing vehicular tire chains comprising a pair of longitudinal chain members connected by a plurality of lateral chain members, said device comprising:
   a. a container having longitudinal walls, end walls and a bottom wall defining an interior and having an open top for receiving said tire chains;
   b. a removably lid having longitudinal and lateral edges for closing said open top of said container, said lid having a surface adapted to support a vehicle wheel, said surface including a platform which defines a raised surface area for carrying said vehicle wheel during installation of said tire chain thereon, at least one channel extending across the width of said lid perpendicularly to the longitudinal axis thereof, said channel being open at its top and at the ends thereof and having a closed bottom surface disposed vertically below the surface area of said platform for receiving a lateral member of said tire chain, at least one lateral end of said lid being longitudinally extended and defining a surface for receiving said vehicle wheel to stabilize said lid and prevent surface movement thereof while said wheel is driven onto said platform surface area; and
   c. latch means for removably securing said lid over said open top of said container.

* * * * *